United States Patent [19]

Mangla

[11] Patent Number: 4,612,153

[45] Date of Patent: Sep. 16, 1986

[54] PROCESS AND APPARATUS FOR THERMOFORMING A THERMOPLASTIC CARTON HAVING AN APERTURE THEREIN FOR LATCHING THE COVER

[75] Inventor: Raj K. Mangla, East Rochester, N.Y.

[73] Assignee: Mobil Oil Corporation, New York, N.Y.

[21] Appl. No.: 630,163

[22] Filed: Jul. 12, 1984

[51] Int. Cl.[4] .................. B29C 67/20; B29C 51/08
[52] U.S. Cl. .................... 264/154; 264/156; 264/163; 264/321; 264/322; 425/290; 425/292; 425/398; 425/817 R
[58] Field of Search ............... 264/321, 154, 156, 163, 264/322; 425/398, 290, 292, 817 R

[56] References Cited

U.S. PATENT DOCUMENTS

| | | | |
|---|---|---|---|
| 2,990,094 | 6/1961 | Reifers | 229/2.5 |
| 3,563,446 | 2/1971 | Lake et al. | 229/2.5 |
| 3,648,916 | 3/1972 | Commisso | 229/2.5 |
| 3,687,350 | 8/1972 | Warburton | 264/321 X |
| 3,735,917 | 5/1973 | Warburton | 229/44 R |
| 3,817,441 | 6/1974 | Jackson | 229/2.5 |
| 3,845,187 | 10/1974 | Dahlberg | 264/145 |
| 3,862,817 | 1/1975 | Dahlberg | 264/163 X |
| 3,908,891 | 9/1975 | Jackson | 229/2.5 X |
| 4,108,941 | 8/1978 | Kermoian | 264/154 |
| 4,142,848 | 3/1979 | Irwin | 425/398 X |
| 4,143,111 | 3/1979 | Irwin | 264/156 |

Primary Examiner—Philip Anderson
Attorney, Agent, or Firm—Alexander J. McKillop; Michael G. Gilman; Charles J. Speciale

[57] ABSTRACT

Apertures are formed in plastic resin sheet material during a thermoforming process by shearing the heated plastic sheet between shear members which have cooperating shear faces extending in two dimensions in a plane perpendicular to the direction of movement of the thermoforming dies. The resulting apertures have a three dimensional configuration.

18 Claims, 15 Drawing Figures

PROCESS AND APPARATUS FOR THERMOFORMING A THERMOPLASTIC CARTON HAVING AN APERTURE THEREIN FOR LATCHING THE COVER

My co-pending U.S. patent application Ser. No. 630,164 filed concurrently with the present application describes a carton having a locking device which can be formed in part by the present moulding device.

BACKGROUND OF THE INVENTION

This invention relates to a mould for forming apertures in plastic resin sheet materials.

Divers kinds of carton formed from sheets of plastic resin materials such as foamed polystrene include latching or locking devices which are used to keep the cover or lid of the carton in a closed position. Egg cartons such as those disclosed in U.S. Pat. Nos. 2,990,094 Reifers, 3,648,916 Commisso, 3,687,350 Warburton, 3,735,917 Warburton and 3,908,891 Jackson, are the most typical of this kind of carton although cartons for other articles, for example, cartons for the so-called "fast food" items such as hamburgers may also include such locking devices. These locking devices usually include a male member, often shaped like a button or a hook which fits into a female locking aperture or slot in the other part of the carton. Originally, the locking slots or apertures were formed by punching them out of the pre-formed carton. Not only was this an expensive procedure, requiring separate punching equipment but problems arose from its use, mainly because accurate registering of the pre-formed carton in the punching equipment was required but could not be consistently achieved in practice.

U.S. Pat. Nos. 3,845,187 and 3,862,817 Dahlberg describe a method by which the apertures may be formed in the carton at the same time as the carton is formed. In the method described in these patents, an attempt is made to form the aperture by tearing and scraping the plastic during the moulding cycle. To do this, the moulding dies are fitted with a resiliently mounted former which presses through the plastic sheet in the mould and then scrapes the softened plastic away from the area where the aperture is to be. Although this approach had the advantage of eliminating the need for separate punching equipment, the tearing process produced results which were unpredictable and, in addition, had a tendency to produce apertures which, having scraped or torn edges, were unslightly.

Improved methods for forming the apertures are described in U.S. Pat. Nos. 4,108,941 Kermoian, 4,142,848-Irwin and 4,143,111 Irwin. In the methods described in these patents, shear members in the male and female moulding dies shear the plastic during the closing of the mould to form the holes in the plastic.

In commonly owned U.S. patent application Ser. No. 531,186, filed Sept. 12, 1983 and now U.S. Pat. No. 4,463,894 by J. L. Daines, another improved method of forming the locking apertures is described, employing a biased shearing key in the mould to shear the softened plastic during the moulding process.

In all these methods, however, the apertures which have been produced are essentially planar apertures, that is, apertures which, except for their extent through the plastic sheet, are purely two dimensional. Certain types of carton, however, require a three-dimensional type of aperture in order to achieve the desired locking effect; for example, refer to U.S. Pat. Nos. 3,735,917 Warburton and 3,908,891 Jackson which show locking apertures which are formed into the side walls as well as the back walls of the locking flutes or recesses. None of the shearing mechanisms shown in these earlier patents is capable of forming such an aperture.

SUMMARY OF THE INVENTION

I have now devised a method for forming a three-dimensional aperture in a sheet of plastic resin material during the moulding process. By a "three-dimensional" aperture, I mean an aperture (in a material of finite thickness) having a configuration upon the face of the material in which it is formed which extends in three dimensions. Such an aperture will be formed in a material which itself has a surface extending in three dimensions, for example, in two intersecting planes or in a single or compound curve.

The three-dimensional aperture is formed in the plastic sheet during a thermoforming process in which the sheet is moulded between male and female die members into the desired shape. The die members include male and female shear keys each of which has a shearing face or faces which extend in the direction of movement of the die members relative to one another and also in two dimensions in a plane extending perpendicular to the direction of die movement.

By shearing the plastic sheet with shear keys having shearing faces which extend in the direction of movement of the die members, a clean cut is made in the carton material, as contrasted to prior techniques in which the hole forming members move in an oblique direction which scrapes the plastic away from the torn edges. By extending the shear keys so that they shear in two dimensions in a plane perpendicular to the direction of die movement, it is possible to form slots or apertures in fluted or recessed portions of the plastic sheet, with the holes extending from the back wall of the flute or recess to the unfluted remainder of the sheet. The hole, moveover, can be situated entirely between the ends of the flute so that its upper and lower margins are within the length of the flute. In contrast to this, prior art shear keys form a merely one dimensioned aperture.

In the most common form, the aperture will be formed in two substantially planar intersecting surfaces of the plastic sheet so that the edges of the aperture will extend in two dimensions in the plane which is perpendicular to the direction of the relative movement of the die members. An example of this is where the aperture is formed in the side walls and the rear wall of a rectilinear locking flute of a plastic carton, as described below. In such cases, the male and female shear keys attached to the respective die members will have multiple shear faces which extend substantially in the same planes as the surface of the sheet; in the case of the rectilinear, generally U-shaped configuration locking flutes described below, the shear keys will have three shear faces in a generally U-shaped configuration so as to form the aperture in the rear wall as well as both side walls of the flute. The apertures may, however, also be formed in plastic sheets which are curved in the plane which is perpendicular to the direction of die movement, by employing appropriately shaped shear keys. The plastic sheet will generally be formed into a configuration in which its surfaces are inclined at an angle to the direction of die movement (measured in a plane parallel to the direction of die movement) in the region of the aperture so that, as the die closes the aperture formed by the action of the shear keys extends through only a limited portion of the sheet.

The three dimensional apertures which are formed in the locking flutes or receses of cartons by the present method are particularly suitable for locking with a continuous, rigid locking member formed integrally with the bottom section of the carton. A carton having a locking device of this kind is described below and in greater detail in application Ser. No. 630,164 and its continuation application Ser. No. 831,088, filed Feb. 20, 1986.

DETAILED DESCRIPTION

Figure 1:
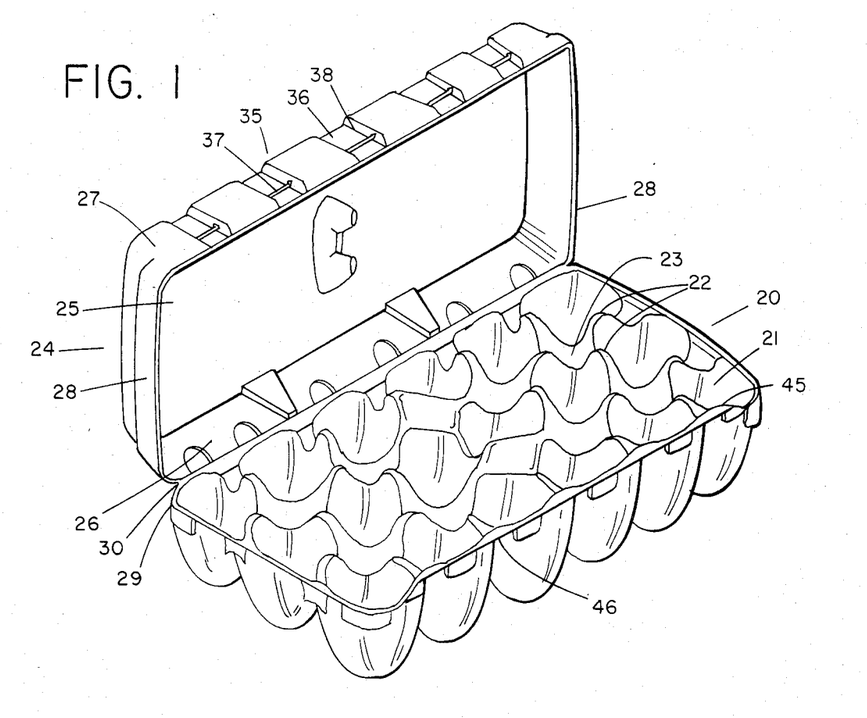
FIG. 1 is an isometric view of an egg carton having a locking device in which the locking aperture is produced by the present method.
Figure 2:
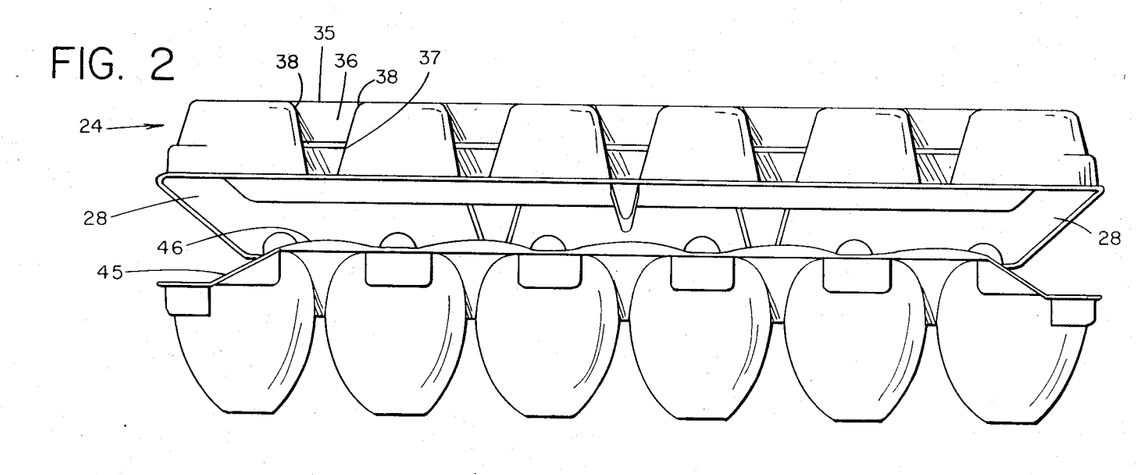
FIG. 2 is a front view of the carton of FIG. 1 in the partly open position.
Figure 3:
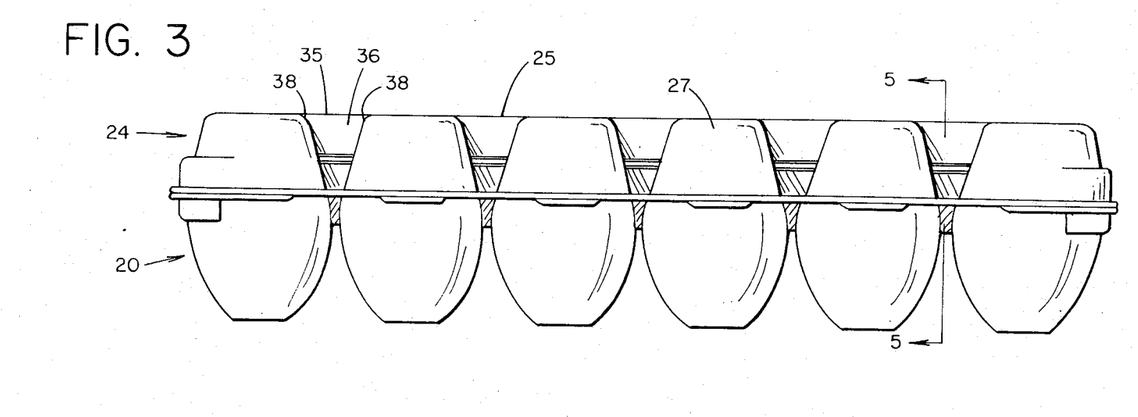
FIG. 3 is a front view of the carton of FIG. 1 in the fully closed position.
Figure 4:
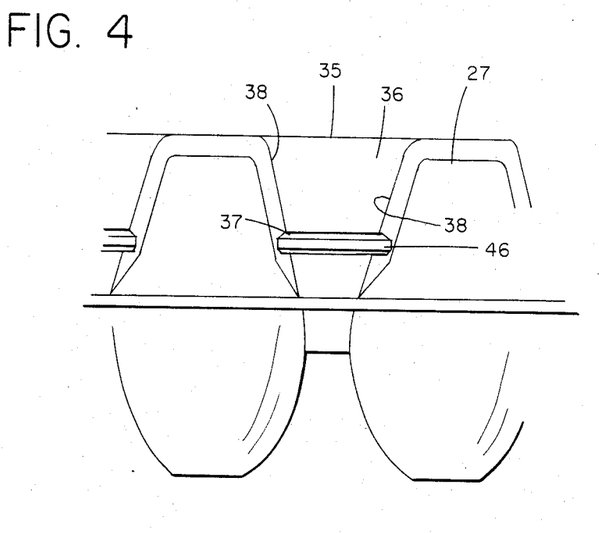
FIG. 4 is a front view of a portion of the carton showing the locking mechanism.

The plastic egg carton shown generally in FIG. 1 of the drawings includes a bottom section 20 with eighteen egg receiving cells 21 (only one is designated) arranged conventionally in three rows of six cells each. In order to provide a high degree of protection for the eggs, projecting tips 22 are provided (only two are designated in FIG. 2) between adjacent cells, both transversely and longitudinally; however, at the counter of the carton, the tips are omitted for a purpose which is described in application Ser. No. 630,164. The use of projecting tips between the egg cells to provide additional protection for the eggs is described in U.S. Pat. Nos. 3,563,446, 3,687,350, 3,817,441 and 3,908,891, to which reference is made for details of various arrangements for these tips, including tips extending in a ridge-like form between two pairs of cells, either in a longitudinal or transverse direction. Any of these arrangements may be used in the cartons but in the carton shown in the drawings, individual tips are provided between each pair of cells, both transversely and longitudinally, except at the center of the carton. Between each group of four tips, a depressed region 23 is provided to permit easy removal of the eggs. However, a different arrangement is used at the center of the carton, as described in Ser. No. 630,164 and its continuation application Ser. No. 831,088, filed Feb. 20, 1986. Other features of the carton including the cover configuration, the arrangements of the cell and protective tips, and the stacking lugs provided at the corners of the carton to permit easy removal from a stack, are also described in Ser. No. 630,164 and its continuation application Ser. No. 831,088, filed Feb. 20, 1986 to which reference is made for a full description of such features.

The cover 24 is of inverted dish-like configuration and has a generally flat top 25, a rear wall 26, a front wall 27 and side walls 28. The cover is integrally formed with bottom section 20 and is attached by rear wall 26 to the rear edge 29 of bottom section 20 by a resilient hinge 30 suitably of single or double fold configuration. Front wall 27 of the cover has a number of locking flutes or recesses 35 which are of wedge-shaped (trapezoidal) configuration although they may also be parallel-sided or even of curvilinear configuration, if desired. Trapezoidal and curvilinear recess configurations having narrower widths at the bottom of the front wall are preferred because they will help to align the cover on the bottom section as the carton is closed. In this case, there is a locking flute situated on the line extending between from each pair of transverse, short (three cell) rows of egg cells, so that there is a total of five locking recesses, only one of which is designated for clarity. However, the number may be varied; for example, two or three symmetrically disposed flutes may be used although, naturally, to do so would not provide so much security as the five shown.

Figure 5:
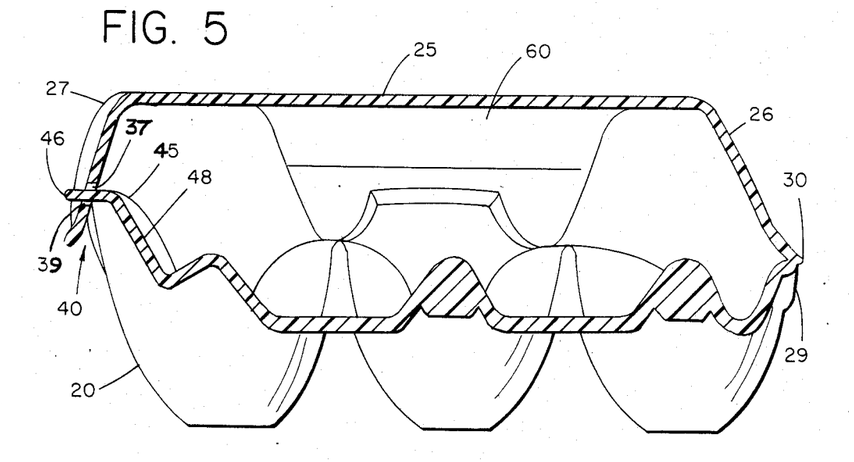
FIG. 5 is a section along 5—5' of FIG. 3.

The rear face 36 of each locking flute 35 is offset inwardly from the remainder of the inner face of front wall 27 and a locking aperture 37, here of slot-like configuration, is provided in each flute, extending along the rear face and into the two side walls 38 of the flute. The locking aperture is formed in the manner described below with a flat edge 39 on its lower margin, preferably with a clean, sharp edge on the inside in order to provide firm, positive locking. The offset of each locking flute 35 increases from the bottom of the flute up to the locking aperture and is of constant depth from the aperture up to the top of the flute so that as the cover is closed onto the bottom section, the sloping inner surfaces 40 of the locking flutes (see FIG. 5) slide easily over the locking member on the bottom section until engagement occurs between the locking surfaces.

The locking apertures are of three-dimensional configuration, that is, they are formed both in the rear face as well as the two side walls of each locking flute. The side walls of the flute form two planes which intersect with the rear wall of the flute to form the three-dimensionally extending surface in which the apertures are formed. Obviously, however, the locking recesses could be of curved, e.g., of semi-circular configuration instead of being rectilinear, as shown.

At the front of bottom section 20 a rigid, integral member 45 is formed by a fixed, upward extension of the egg cells and the region between them. The locking member has five locking extensions 46 (one designated) which extend forwards toward the inner face of front wall 27 of cover 24 when the cover is in the closed position (see FIG. 6). These locking extensions, one for each locking recess, are formed by a forward extension of the plastic sheet in the region between each short row of egg cells; because the curving wall of each egg cell is close to the edge of the carton, there is no forward extension of the sheet along the center line of each short row of cells but, in principle, there is no reason why it should not be provided there to provide a continuous locking extension along the entire top edge of locking member 45.

The carton is made by thermoforming a sheet plastic resin material into the requisite shape. The preferred plastic resin material for making egg cartons is foamed polystyrene because it is cheap and has satisfactory mechanical properties. It has adequate stiffness, provides satisfactory protection for the eggs and can be readily printed. However, other plastic resin materials could be used, depending upon the type of articles to be packaged in the carton. The manufacture of the cartons will be described below by specific reference to the use of foamed polystyrene for making egg cartons but similar methods may be used with other sheet plastic resin materials with appropriate modification of process conditions; e.g. sheet thickness, mould compression and pressure, temperature, mould cycle time and so forth.

In the thermoforming operation, a sheet of the plastic resin material is moulded between male and female dies or mould members into the desired configuration. The temperatures encountered during the moulding operation will tend to cause sheets of foamed polystyrene to expand but the mould configuration will control the thickness of the sheet in the various parts of the carton; some parts may be thinner than the initial sheet and others thicker.

Figure 6A:
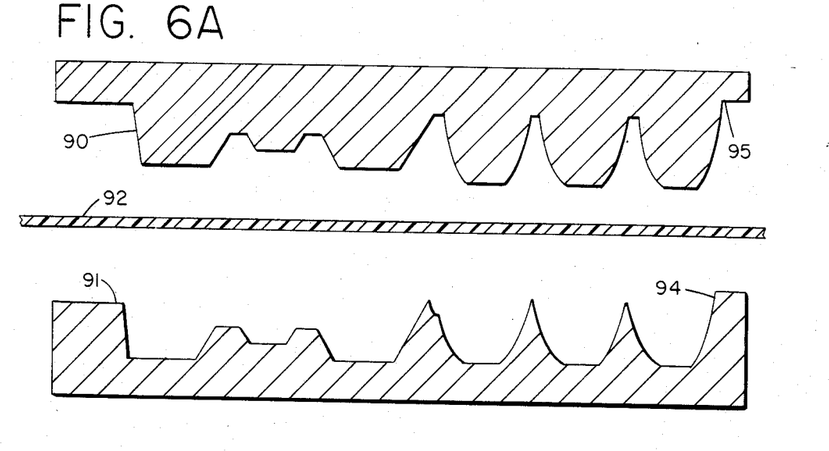
FIGS. 6A, 6B and 6C illustrate the method by which the carton may be formed.
Figure 6B:
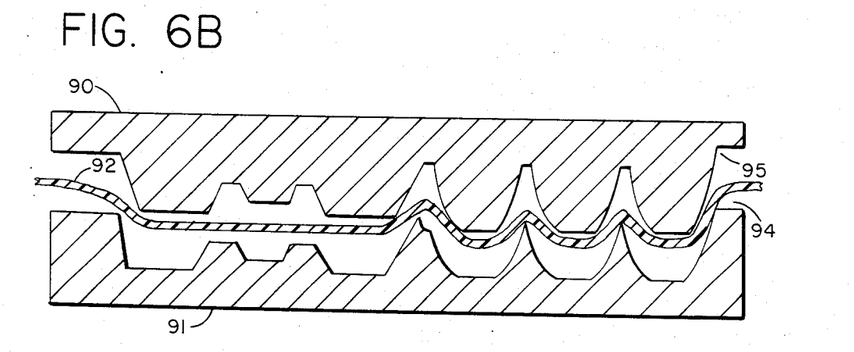
Figure 6C:
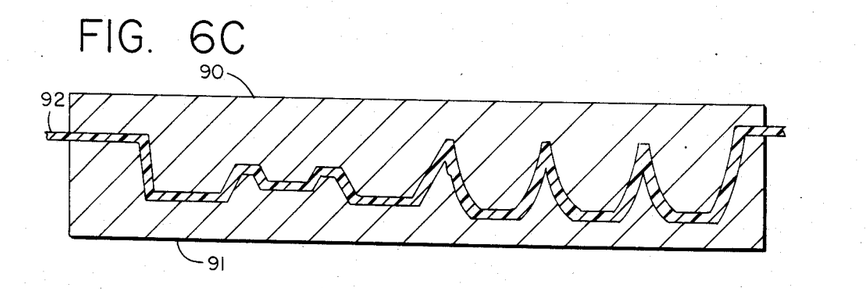

The moulding cycle is shown in FIGS. 6A to 6C, in simplified form. A male die 90 can be closed on a female die 91 with the sheet of plastic resin material 92 between them. In practice, the mould members will have a number of carton moulding cavities arranged in them so that a number of cartons can be formed at each closing of the dies, but only one pair of carton moulding dies are shown in the drawings, for clarity.

As the dies close, as shown in FIG. 6B, the plastic sheet is drawn down to stretch the plastic over the die members until, when the dies are completely closed, as shown in FIG. 6C, the sheet is formed into the desired configuration between the male and female dies. At the same time as the sheet is shaped, the locking slots are formed in the manner described in detail below. In order to form locking member 45, the male and female dies are shaped so as to draw the sheet up from the sheet line in the opposite direction to that in which the bottom section and the cover are formed. To do this, a former 94 on the female die 91 which produces the front of the carton is extended upwards, and the edge of the male die correspondingly cut away to form cavity 95, so that when the dies are closed (FIG. 6C), the plastic sheet is drawn upwards to form the locking member, in the opposite direction to that in which the cover and bottom sections are drawn. As shown in FIG. 6C, the cover and the bottom section are drawn downwards from sheet line 96 and the locking member is drawn upwards from the sheet line. Locking extensions 46 on the locking member are formed by the outward extension of the sheet. Trimming of the thermoformed sheet following ejection from the mould provides the desired sharp edge to the locking extensions.

As previously mentioned, the locking slots 37 in the locking recesses are three-dimensional slots which extend along the rear face 36 of each locking flute and into its side walls 38. In order to provide firm locking engagement with locking extensions 46 on the locking member these locking slots should be as sharply edged and as well-defined as possible. It has been found that such slots can be made by shearing the plastic sheet during the thermoforming operation rather than going to the additional expense of a cutting operation subsequent to the thermoforming step.

Figure 7A:
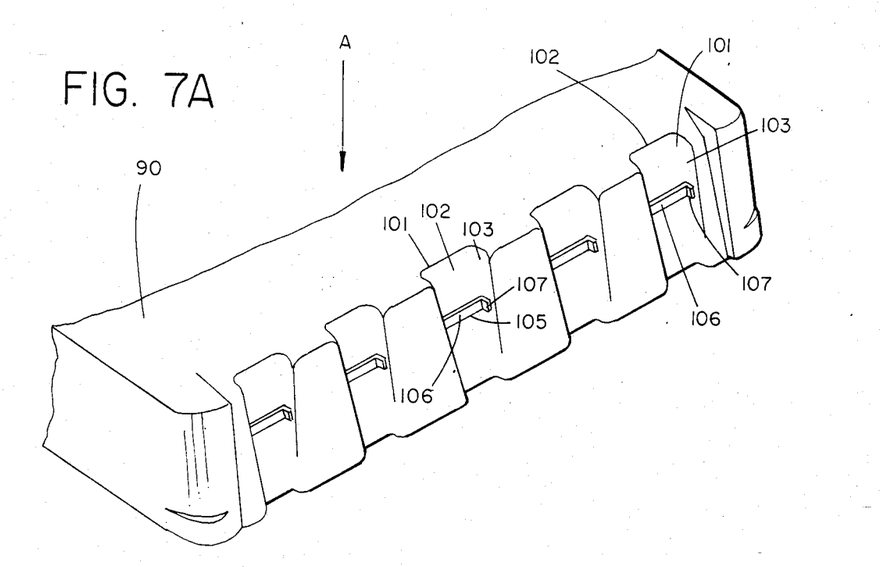
FIG. 7A is a partial isometric view of the male die showing the shear keys used to form the apertures.
Figure 7B:
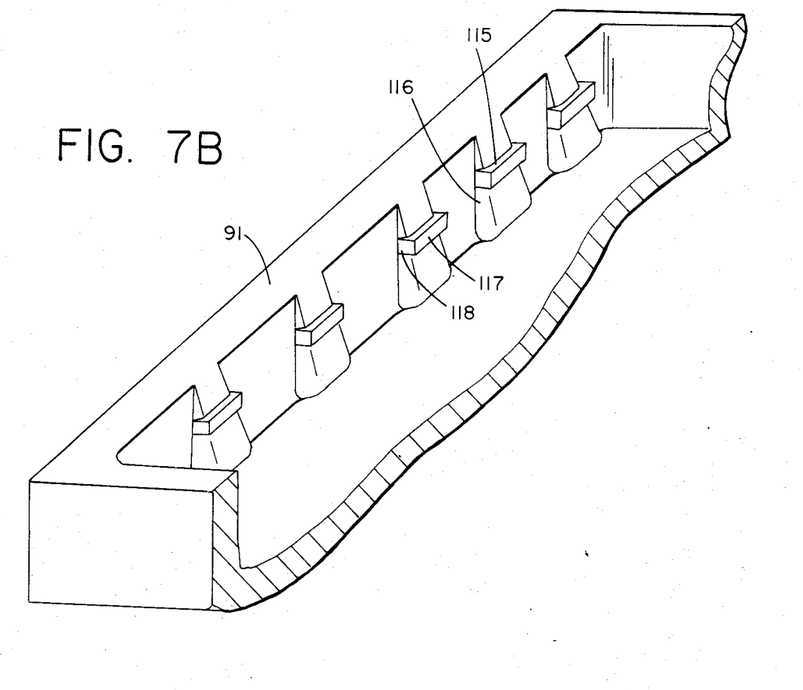
FIG. 7B is a partial isometric view of the female die showing the shear keys used to form the aperture.
Figure 7C:
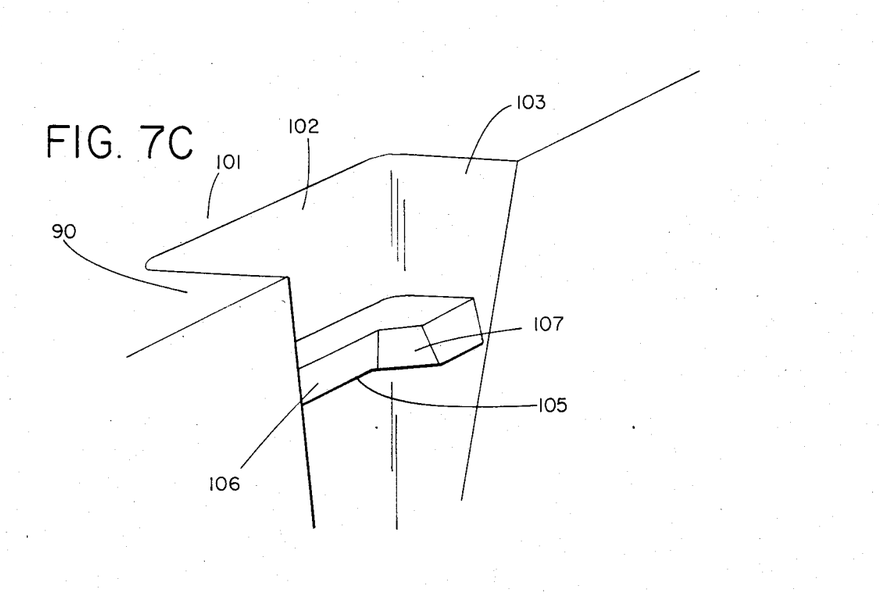
FIG. 7C is an enlarged view of part of FIG. 7A.
Figures 8, 9:
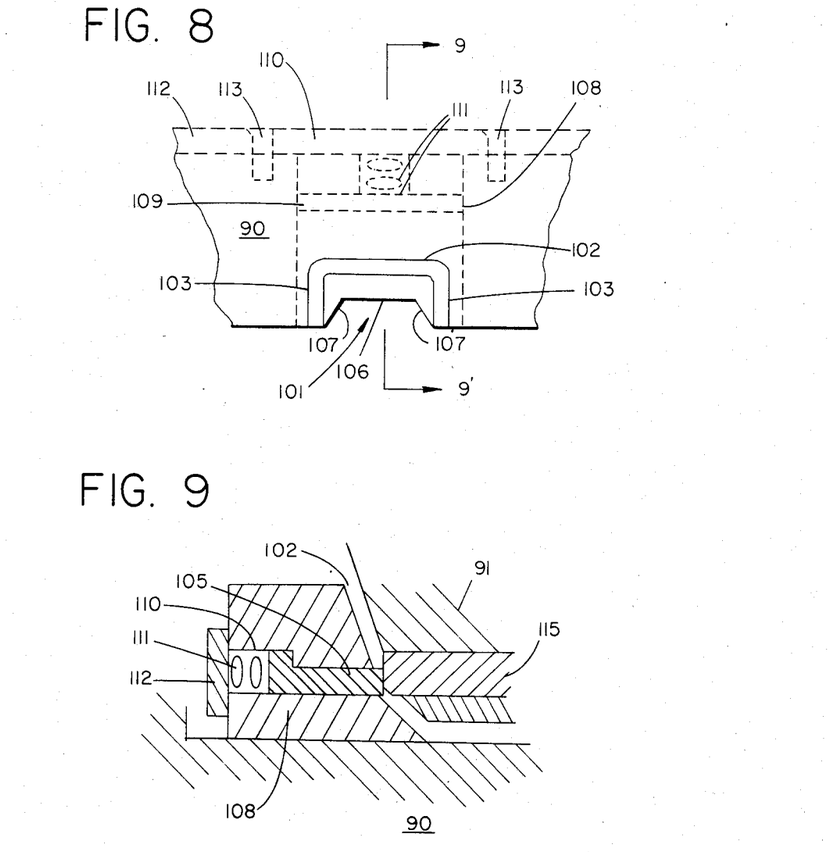
FIG. 8 is a view of part of FIG. 7A in the direction indicated by arrow A.
FIG. 9 is a section along line 9—9' of FIG. 8 and with the female die in the closed position.

A partial view of the male and female moulding dies is given in FIGS. 7A and 7B respectively, showing the die configurations in the areas where the locking recesses are formed. The male die has a configuration which conforms to the configuration desired for the inside of the carton. The portion of the male die used to form the inside of the locking flutes with their attendant locking slots is shown in FIGS. 7A and 7C and FIG. 8 shows a vertical view of one of the depressions in the die which are used to form the recess and its slot. The corresponding female die forms the outside of the carton and FIG. 7B shows the part of the female die which mates with the part of the male die shown in FIG. 7A. The shearing action of the shear keys is shown in FIG. 9.

The inner moulding surface of male die 90 has a number of depressions in the surface used to form the rear face of the front wall of the cover. These depressions, 101, correspond in number to the number of locking flutes to be formed in the cover of the carton (only one is designated in FIG. 7A for clarity). Each depression has a rear wall 102 and side walls 103 which are joined to the rear wall by means of a curving fillet. The depression is both deeper and wider at its top end than its bottom (referring to the disposition of the die shown in FIG. 7A, although it should be remembered that in use the male die will be inverted from this position), in order to give the correct trapezoidal, wedge-shaped configuration to the locking flutes.

The multi-faced male shear key 105 for forming the locking slot is situated a little more than halfway down depression 101, at the point where the locking slot is to be formed. Male shear key 105 (shown by itself in FIG. 10) has a rear shear face 106 and two lateral shear faces 107 which are inclined at an angle laterally to the rear shear face. Rear shear face 105 projects out from rear wall 102 of the depression in order to engage with the shear key on the female die to form the locking slot. The lateral shear faces on the male shear key are inclined at an angle (with respect to the rear shear face) which corresponds substantially to the angle of the side walls of the locking flute (with respect to the rear wall of the flute) and thus, the angle chosen will depend upon the configuration of the flute. If the recess is curvilinear in cross-section, e.g., arcuate, the male shear key may have a corresponding contour and the female shear key will have a like contour.

Figure 10:
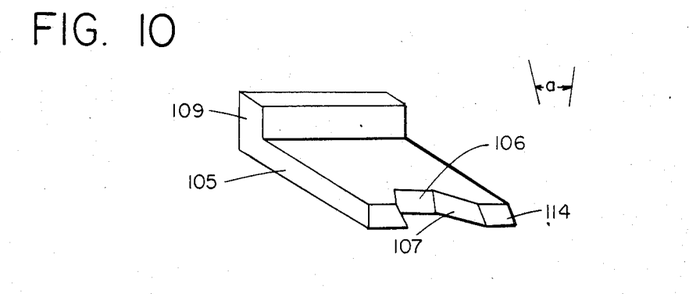
FIG. 10 is an enlarged view of the multi-faced male shear key.

Male shear key 105 is retained in a slot-like channel 108 within the body of male die 90. It is held within the channel by means of an abutment 109 at its rear end which fits within a cavity 110 in the body of the die. The shear key is pre-loaded by means of concavo-convex washers 11, although other suitable biasing means such as springs, resilient pads or pneumatic or hydraulic devices could be used. The simpler mechanical devices such as the washers shown or springs will normally be preferred for simplicity. The pre-load washers are held in by backplate 112 which is retained by means of screws 113.

The foremost faces 114 of the male shear key are chamfered to provide a ramp down which the leading corner of the female shear key may slide as the dies close. For this purpose, a ramp angle, a, (FIG. 10) of from about 10° to 30°, preferably about 15° to 20°, will be suitable. For similar reasons, the shear faces of the shear key may be inclined at a very slight angle to the direction of die movement although the angle in this case should be much less, preferably about 1°–4°, in order to promote good shearing action. The angle selected should be such that when the shear keys come together, the aperture is formed by what is a shearing movement between essentially parallel shearing faces. The most efficient shearing action and the cleanest apertures are produced by minimizing any scraping action of one shear key upon the other; to this end it would be preferred for the shear faces of the two keys to be wholly parallel but, for practical reasons, the very slight incline is advantageously provided to allow for mechanical inaccuracies and to ensure constant contact between the shearing surfaces as the mould is closed.

The corresponding multi-faced female shear key 115 is fitted into female die 91 in recess-forming ramp 116 which has a configuration conforming to that desired in the outer surface of the locking recesses. The female shear key may be positively fixed in female die 91 without providing for any movement as the male shear key will be capable of taking up any side play during the moulding cycle. However, a relief chamfer may be provided on the leading edge of the female shear key (see FIG. 9) in order to ease the shear faces over one another at the beginning of the shearing action and to prevent chipping of the keys at their leading edges.

As the plastic sheet is drawn into the mould by the movement of the dies, the mating die surfaces approach one another more closely until the shear faces of the male and female shear keys come into engagement with one another, just before the dies close completely. The front shear face 117 of the female shear key then engages with rear shear face 106 of the male shear key and the lateral shear faces 118 (only one designated in FIG. 7B) with the lateral shear faces 107 of the male shear key. Further closing movement of the dies then shears the heat-softened plastic away from the shear faces of the shear keys, this process being assisted by the inherent tendency of the softened plastic to draw away from any puncture formed in it. The exact mating between the shear keys which is provided by their configuration and the pre-load on the male key ensures that a clean, sharp-edged locking slot is formed in the carton which gives the desired efficient locking characteristics.

As may be appreciated from this discussion, the locking slots are formed in two dimensions in the plane sectioning the rear and side faces of the locking flutes. Also, the top and bottom edges of the locking slots are accommodated within the length (top to bottom) of the flutes so that the slots are formed wholly within the confines of the length of the flutes, although, of course, the slots may be continued laterally along the front wall of the carton, if desired. Thus, the slots are bounded upon two edges by margins which extend in two dimensions in the plane perpendicular to the direction of die movement and they have a finite extent (fixed by the length of the shear faces of the shear keys) in the direction of relative die movement. The sloping configuration of the lower part of the locking flute below the locking slot i.e. its varying offset from the inner face of the front wall of the cover also contributes to defining the size and final shape of the slot and should therefore be taken into consideration when fixing the characteristic configuration of the locking elements.

Figure 11:
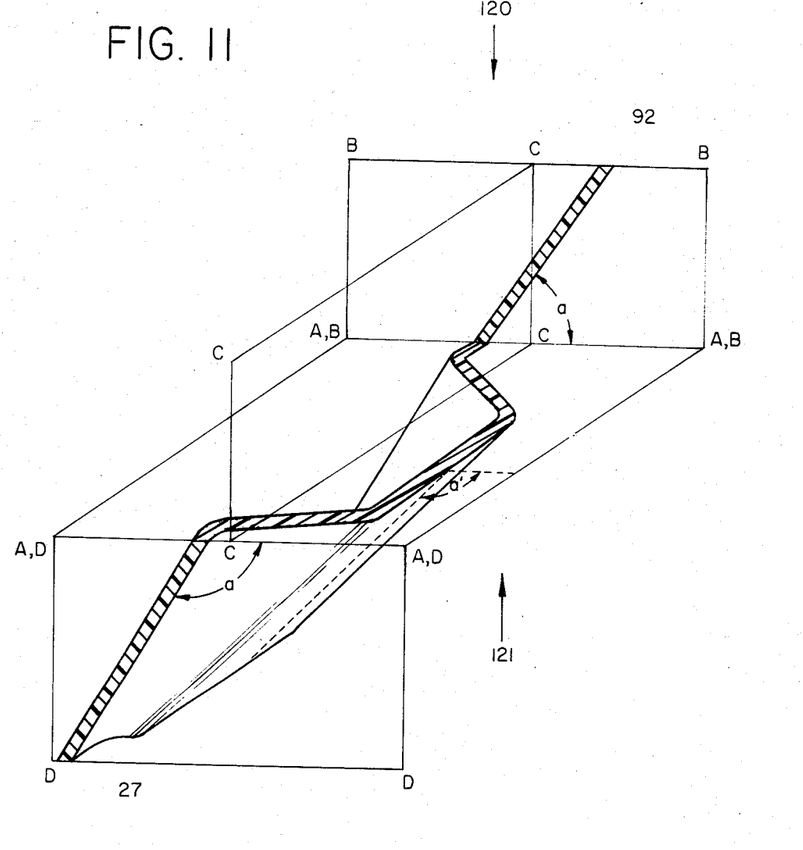
FIG. 11 is an illustration showing the manner in which the aperture may be formed relative to the direction of die movement and the surface of the plastic sheet.

FIG. 11 illustrates in schematic form the directions in which the aperture may extend relative to the direction of die movement and to the surface of the plastic sheet. In FIG. 11, three mutually orthogonal planes A-A-A-A (the A plane), B-B-B-B (the B plane) and C-C-C-C (the C plane) are indicated, together with a fourth plane, D-D-D-D (the D plane) which is parallel to the B plane. The planes meet in the region in which the aperture is formed in the plastic sheet 92. The plastic sheet is sectioned along, respectively, the D plane, the A plane and the B plane. The plastic sheet is shown in its thermoformed condition i.e. after moulding has been completed, in the region of the locking flute where the aperture is formed. Accordingly, the inner face of the front wall 27 of the cover slopes down from the A plane at an angle a; the inner 40 of the locking flute slopes down from the B plane at a greater angle, a', as this face is inclined at a different angle than the front wall of the cover (see FIG. 5). The front wall of the cover continues on above the A plane, as shown by the section along the B plane, at angle a. The direction of die movement is indicated by arrows 120 and 121 for the female and male die members, respectively. As can be seen, a section of the plastic sheet extends in two dimensions in the plane perpendicular to the direction of die movement, i.e. the A plane. Obviously, if the flute had a curvilinear cross section, the sheet would still extend across the A plane in a similar manner, except that the section in the A plane would differ from the generally rectilinear U-shape shown on the Figure. The shear keys will normally have a configuration which conforms to that of the flute and therefore will normally extend across the A plane in a similar manner. As shown, the plastic sheet is also inclined at an angle to the direction of die movement, as indicated by arrows 120 and 121. The angle of the sheet surface with respect to the direction of die movement is measured in the B plane which is parallel to the direction of die movement and is equal to $(90+a)°$ for the surface of the front wall and $(90+a')°$ for the surface below the locking aperture, measured in the clockwise sense from vertically above.

I claim:

1. In a method for forming an aperture in a sheet of plastic resin material during a thermoforming moulding process by moulding the sheet at an elevated temperature between male and female die members which are capable of being moved from an open position to a closed, moulding position, the improvement which comprises forming the aperture in a three-dimensional configuration in the material by shearing the sheet at an elevated temperature by means of cooperating shear members on the die members, the shear members having three cooperating shear faces which extend in the relative direction of movement of the die members and in two dimensions in a plane extending perpendicular to the direction of die movement.

2. A method according to claim 1 in which the three-dimensional aperture is formed in two substantially planar intersecting surfaces of the plastic sheet, the aperture having a margin which extends in two dimensions in the plane which is perpendicular to the direction of die movement.

3. A method according to claim 1 in which the three-dimensional aperture is formed in the surface of a plastic sheet having a curved surface, the aperture having a curved margin which extends in two dimensions in the plane extending perpendicular to the direction of die movement.

4. A method according to claim 1 in which the shear members each have three planar shear faces arranged in a substantially U-shaped mating configuration.

5. A method according to claim 1 in which the sheet has a surface when is inclined at an angle to the direction of die movement, measured in a plane parallel to the direction of die movement.

6. A method according to claim 1 in which the aperture has two margins which extend in two dimensions in the plane which is perpendicular to the direction of die movement.

7. A process for the production of a thermoformed thermoplastic carton comprising:
   (i) providing a relatively flat sheet of polystyrene foam;
   (ii) preheating said sheet to a forming temperature;
   (iii) thermoforming the preheated sheet by bringing together a male mould member and female mould member to form the carton including a cover having an offset surface which is inwardly offset with respect to the front wall of the cover;
   (iv) shearing an aperture in the offset surface while thermoforming by relative movement between a male key mounted on the female mould member, each key having three cooperating shear faces, the movement being parallel to the closing motion between the male and female members; and
   (v) shearing the sheet between the offset surface and the front wall of the cover to extend the aperture to the front wall.

8. A process according to claim 7 which:
   (i) the male mould member has a depression with a rear wall and side walls which are joined to the rear wall to form the offset surface,
   (ii) the male key is located in the depression where the aperture is to be formed,
   (iii) the male key has a rear shear face and two lateral shear faces which are inclined at an angle to the rear shear face, and
   (iv) the shearing is carried out by engagement between the shear faces of the male and female keys in a direction parallel to the closing motion between the male and female mould members.

9. A process according to claim 8 in which the two lateral shear faces of the male key are inclined laterally at an angle to the rear shear face which corresponds substantially to the angle between the side walls and the rear wall of the offset depression.

10. A process according to claim 9 in which the female key has shear faces having a corresponding configuration with the shear faces of the male key.

11. A process according to claim 10 in which the shear faces of the male and female keys lie in planes substantially parallel to the closing motion between the male and female members.

12. A process according to claim 11 which includes biasing the male shear key towards engagement with the female shear key so that the shear faces engage in a movement parallel to the closing motion between the male and female members.

13. A mould for forming apertures in a thermoformed plastic resin article by moulding a sheet of plastic resin material by thermoforming, comprising:
   (i) male and female die members between which a preheated sheet of the plastic resin material may be positioned when the members are in an open position from which they are capable of being moved to a closed position in which they form the sheet into the desired configuration,
   (ii) first and second shear members attached to the male and female die members, respectively, the shear members having three shear faces which extend outwardly from moulding faces of their respective die members to form mating cooperating shear faces which extend in the relative direction of movement of the die members and in two dimensions in a plane extending perpendicular to the direction of die movement.

14. A mould according to claim 13 in which the male die member has a depression on its interior surface and the female die member has a cooperating raised protrusion on its interior surface to form a recess in the thermoformed article, the shear members having shear faces extending outwardly from the channel and the raised protrusion, respectively, to form the apertures in the recess.

15. A mould according to claim 14 in which the depression has a rear wall and two side walls in a generally U-shaped configuration and the protrusion has a front face and two side faces in a generally U-shaped configuration.

16. A mould according to claim 15 in which the first shear member has a shear face parallel to the rear wall of the depression and lateral shear faces parallel to each of the side walls of the depression.

17. A mould according to claim 15 in which the second shear member has a shear face parallel to the front face of the protrusion and lateral shear faces parallel to the side faces of the protrusion.

18. A mould according to claim 14 in which the first shear member is resiliently mounted in the male die member for movement in a plane perpendicular to the direction of relative movement of the die members.

* * * * *